UNITED STATES PATENT OFFICE.

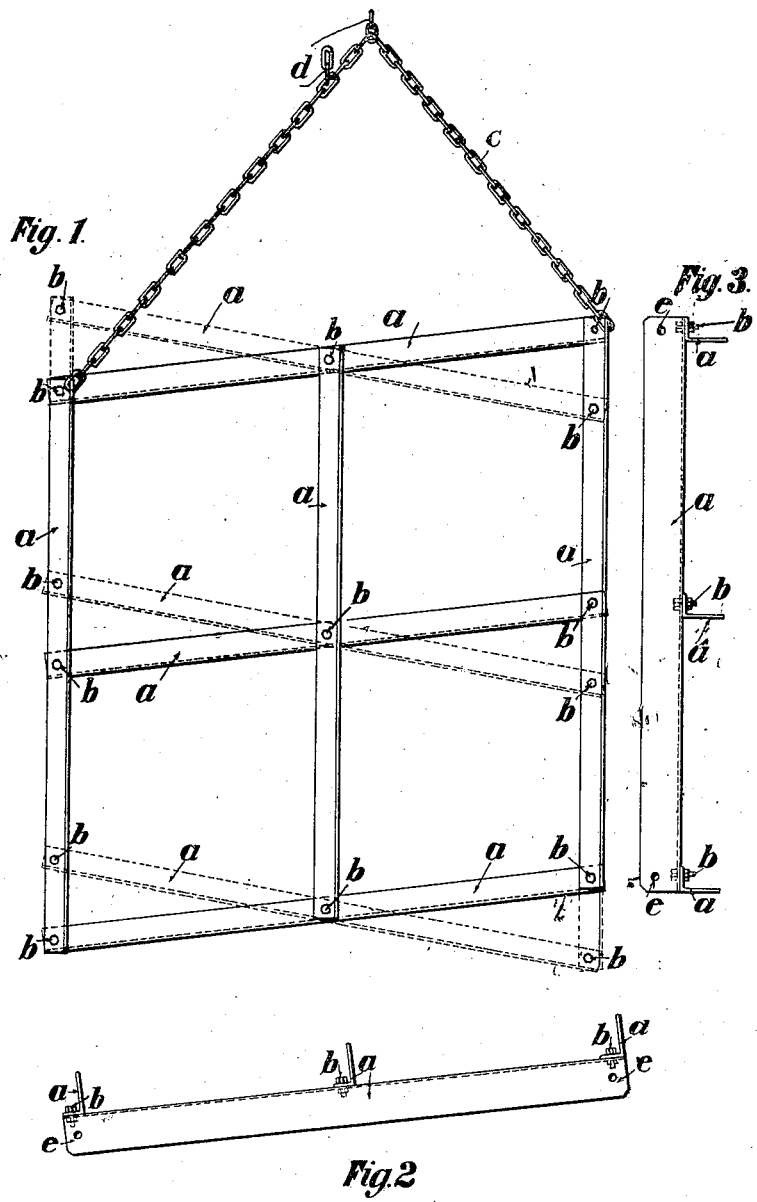

LORENZO CHARLES AVERELL, OF CAMBRIA, NEW YORK.

ROAD HONE-SCRAPER.

1,070,381.

Specification of Letters Patent.

Patented Aug. 12, 1913.

Application filed March 7, 1912. Serial No. 682,189.

*To all whom it may concern:*

Be it known that I, LORENZO CHARLES AVERELL, a citizen of the United States, residing at Cambria, in the county of Niagara and State of New York, have invented a new and useful Road Hone-Scraper, of which the following is a specification.

This invention relates to the implements employed for scraping and grading roads and highways.

Its principal object is the production of a simple, effective and inexpensive road scraper which has a duplex scraper-surface, in order to materially lengthen the life of the implement, and which is at the same time readily adjustable to deliver the surplus scrapings at either side of the implement, or to scrape the earth and stones forwardly for filling holes and depressions in the road.

A further object is to so construct the device that the scraper blades are capable of yielding to obstacles in the road, for protecting them from injury or breakage.

In the accompanying drawings: Figure 1 is a plan view of the road scraper, showing its transverse scraper-bars adjusted at an oblique angle to the line of draft. Figures 2 and 3 are elevations of the device viewed from adjacent sides or ends thereof.

Similar letters of reference indicate corresponding parts in the several figures.

The frame of the implement is composed of a suitable number of longitudinal and transverse bars $a$, preferably six angle bars of equal length, approximately six feet long and having flanges respectively three inches and five inches in width, but they may obviously be made of other dimensions if desired. The three bars on each side of the frame are parallel and equidistant and pivotally connected by bolts $b$ to the contiguous bars at the several points of intersection. The narrow horizontal flanges of the upper and lower angle bars are arranged back to back, so that the vertical flanges of the upper bars project upwardly and those of the lower bars downwardly, these vertical flanges constituting two sets of scrapers or scraper-blades, either of which may be brought into operative position by inverting the implement. The pivot bolts $b$ permit the transverse bars to be adjusted at right angles to the longitudinal bars and the line of draft, or at a greater or less oblique angle to said line in either direction by shifting the parallelogram formed by said bars into different positions as indicated by full and dotted lines in Fig. 1.

At its several sides or ends the frame of the scraper is provided with holes $e$ or other means for the attachment of a draft device or chain $c$, with the links of which the drawhook of a whiffletree or equivalent device (not shown) may be engaged, so that said chain may be transferred from one end or side of the implement to another.

When it is desired to use the scraper with its transverse scraper-flanges square or at right angles to the line of draft for leveling ridges and filling holes in the road, the whiffletree hook is attached to the center link of the chain $c$, causing the draft to be exerted in the longitudinal center line of the implement and the transverse bars to assume and maintain a position perpendicular to the longitudinal bars. When it is desired to deliver the surplus scrapings at one or the other side of the scraper, the whiffletree-hook is engaged with a link of the chain on one side of its center link, say one of the links $d$, whereupon the transverse scraper-bars will be swung at a greater or less oblique angle to the line of draft, as shown in Fig. 1, and deflect the scrapings to either side accordingly.

By transferring the draft chain $c$ to the rear or opposite end of the implement, the latter may be run in the reverse direction, with the result that the scraper blades are automatically sharpened.

When the scraper blades on the lower side of the implement become worn, it is inverted to bring the other set of blades into operative position, thus doubling the wearing surface of the implement. After thus turning the implement upside down, the draft chain is transferred to one of the adjacent sides of the frame and engaged with the set of holes $e$ therein, in order to place crosswise of the line of draft those bars which before ran lengthwise thereof; in other words, after inverting the implement it is necessary to give it a quarter turn from its former position and transfer the draft-chain to the leading end of the frame.

It will be noted that the adjustment of the scraper bars and their maintenance in adjusted position is effected by the draft chain alone, no braces or other additional means being employed for firmly holding the scraper blades in position. It follows that in case the blades encounter obstructions in the road, they are free to yield, preventing damage or breakage thereof.

This improved road-scraper while combining the desirable features of largely increased wearing qualities and ready adjustability, involves a minimum number of parts of simple construction which can be produced from commercial bars and assembled by unskilled labor, rendering its cost comparatively small.

I claim as my invention:

1. An invertible, duplex road-scraper comprising a set of parallel longitudinal bars, and a second set of parallel transverse bars intersecting said longitudinal bars and pivotally connected thereto, whereby the transverse bars are adjustable at various angles to the line of draft by shifting the parallelogram formed by the two sets of bars into different positions, the bars of one of said sets having upwardly-extending scraper-flanges and those of the other set having downwardly-projecting scraper-flanges, adjacent sides of said parallelogram having attaching means for a draft device, whereby the scraper may be operated with either side down and with the scraper flanges at an angle to the line of draft, by transferring the draft device from one set of said attaching means to the other.

2. An invertible, duplex road scraper comprising a set of parallel longitudinal angle-bars of substantially equal length, and a second set of parallel angle-bars of substantially equal length arranged transversely of said longitudinal bars and pivotally connected thereto, whereby the transverse bars are adjustable at various angles to the line of draft by shifting the parallelogram formed by the two sets of bars into different positions, the horizontal flanges of the longitudinal and transverse bars being arranged back to back, whereby the vertical flanges of one of the sets of bars extend upwardly and the corresponding flanges of the other set extend downwardly, adjacent sides of the parallelogram having attaching means for a draft device, whereby the scraper may be operated with either side down and with the scraper-flanges at an angle to the line of draft, by transferring the draft device from one set of said attaching means to the other.

3. An invertible, duplex road-scraper comprising a set of parallel longitudinal bars having upwardly-projecting scraper-blades, a second set of parallel transverse bars intersecting said longitudinal bars and having downwardly-projecting scraper-blades, the two sets of bars being pivotally connected together at their points of intersection but otherwise disconnected and free to swing on each other to yield to obstacles in the road, and a transferrable draft device adapted to be attached to different sides of the parallelogram formed by said bars.

L. CHARLES AVERELL.

Witnesses:
EDWARD GRAM,
LAURIE B. BUFFINGTON.